Dec. 8, 1942.  W. LEATHERS  2,304,698

METER READING APPARATUS

Filed Aug. 2, 1940

INVENTOR
Wad Leathers

Patented Dec. 8, 1942

2,304,698

UNITED STATES PATENT OFFICE 2,304,698

METER READING APPARATUS

Ward Leathers, Brooklyn, N. Y., assignor, by mesne assignments, to International Business Machines Corporation Application August 2, 1940, Serial No. 349,974

6 Claims. (Cl. 177—351)

The improved signal transmitting apparatus comprising the present invention is primarily adapted for use in connection with metering systems of the type ordinarily employed for registering the volume consumption of the metered commodity which may, for example, be electricity, gas, water and the like. The primary purpose of the invention is to provide a system and apparatus for recording or indicating at a central station the reading of such a meter at a remote point.

The invention in its broadest aspect, however, is capable of other uses and the same may be employed for the transmission of readings of meterological or other scientific instruments to a remote point and for the registering or recording of these readings in various ways at will or at predetermined intervals. Broadly, therefore, the invention contemplates the provision of an apparatus whereby a physical responsive effect is produced in accordance with an initiating change and has particular reference in this broad sense to an apparatus whereby a counter is actuated, a pointer is positioned, a recording is made or some other mechanism is actuated in accordance with the physical movement of a member which may be, for example, a meter dial or pointer, a liquid level gauge or the like.

The apparatus when utilized for meter reading purposes has particular reference to that type of integrating meter which employs a series of decimal integrating cyclometer dials or wheels which are turned in step-by-step fashion to indicate the prevailing volume consumption of the metered commodity and which therefore remain unchanged in their position during the intervals between actuating impulses.

In such an instance, as well as when the invention is utilized for other purposes, the effect produced is not dependent upon the energy of the particular change occurring at the primary point. Thus for "telelector" purposes (a coined word signifying distant reading), especially where watt-hour meters are concerned, the present invention enables the energy required for operating the usual meter armature to be maintained at a minimum despite the fact that considerable power input may be utilized at the central station for actuating the indicating device or recording mechanism.

Specifically, it is an object of the present invention to provide a telelector system of the character set forth above which will indicate at a central station not only the reading or indication of a meter, but also the arbitrary meter number. In other words, according to the invention, the meter may be set up to yield at the central station both the arbitrary number of the meter and its particular dial indication as well as any other data that it may be desired to indicate or record, the initiating effect being obtained by a simple repetitious manual operation.

Another object of the invention is to provide a system of this character which in operation is extremely accurate and which will maintain its accuracy over a long period of time without requiring constant attention. A similar object is to provide a telelector system which is mainly electrical in its effect and which is comprised of a minimum number of moving parts and which consequently is unlikely to get out of order.

Yet another object of the invention is to provide an apparatus which is extremely flexible from the standpoint of installation and maintenance and which may by a relatively simple manual operation be converted for use with meters having different meter numbers or varying data which it is desired to be recorded.

Another object of the invention, in a meter construction, is to provide a decimal cyclometer dial or wheel of the integrating type set forth above which, by a novel mechanism, is capable of assuming successive positions representing successive numerical values and which, during the interval between the periodic indexing operations whereby the dial or wheel is progressively moved, will remain accurately in a fixed position.

Other objects and advantages of the invention not at this time enumerated, will become readily apparent as the nature of the invention is better understood.

In the accompanying single sheet of drawings forming a part of this specification:

In both of the above-described views, like characters of reference are employed to designate like parts throughout.

Figures 1, 2:
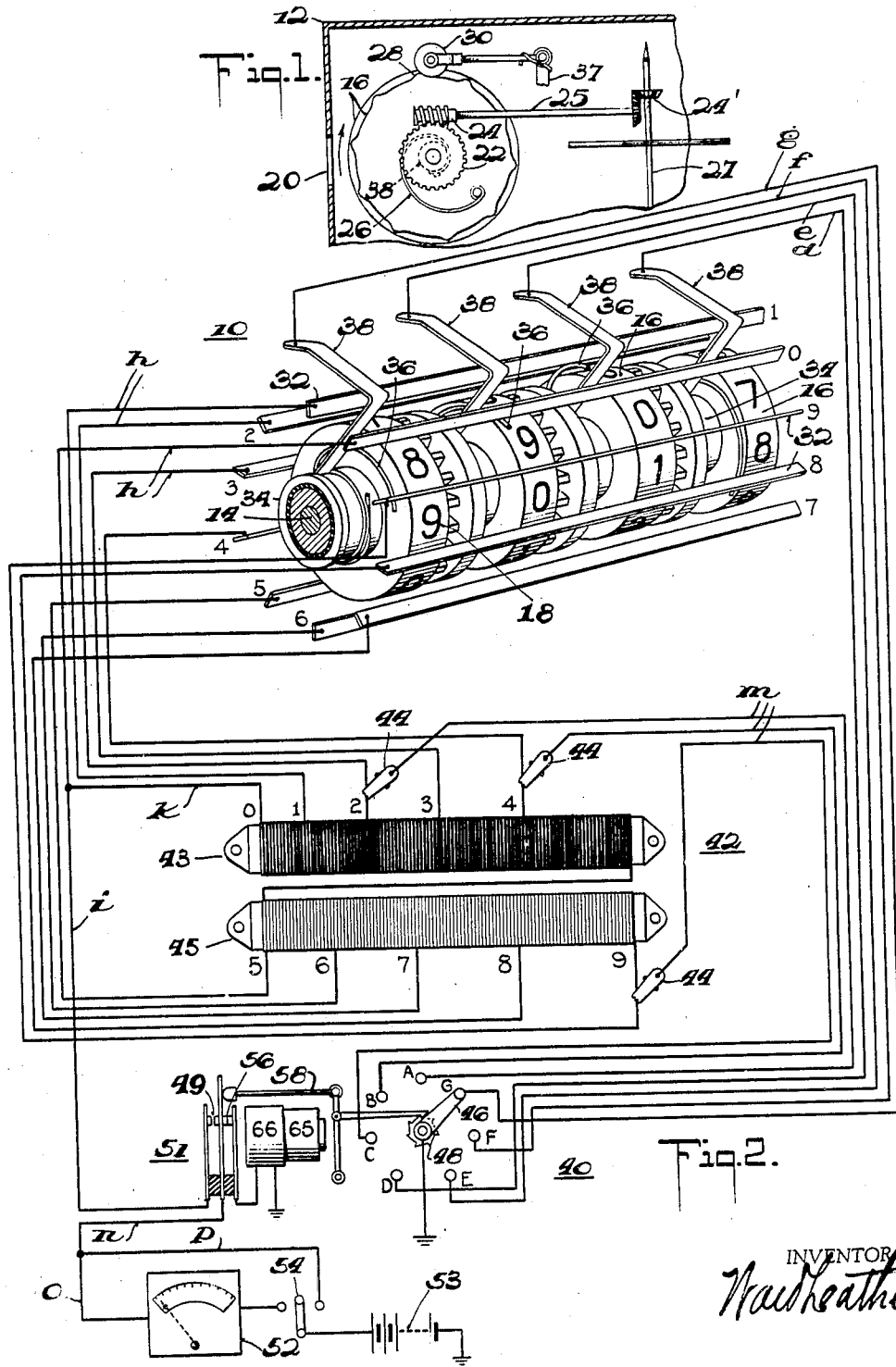
Figure 1 is an end elevational view of a cyclometer mechanism constructed in accordance with the principles of the present invention showing the same operatively mounted within a meter casing and operatively connected to the usual meter armature shaft.
Figure 2 is a perspective view (diagrammatic in its representation) of a cyclometer assembly likewise constructed according to the principles of the invention and showing the same operatively associated in an electric telelector system.

Referring now to the drawing in detail, the apparatus involves in its general organization a cyclometer wheel or cylinder assembly 10 operatively disposed in a meter casing 12 and including a fixed supporting shaft 14 for a plurality of axially aligned cyclometer wheels 16 carrying on their circumferential surfaces a plurality of indicia 18 in the form of Arabic numerals consecutively arranged from 0 to 9. A window 20 formed in the casing permits ready visualization of these numerals for meter reading purposes by an observer.

The wheels or cylinders 16 are capable of independent movement on the shaft 14 and are so designed that they will cumulatively indicate the measured volume consumption of current as expressed in watt-hours. The specific mechanism whereby such cumulative additive indication is obtained is not disclosed and any one of a number of well known step-up cumulative mechanisms utilizing a driving gear 22 may be employed. Irrespective, however, of the specific mechanism employed for this purpose, the essential features of the invention are at all times preserved.

Any suitable number of cylinders 16 may be employed, but in the present instance there have been illustrated four such cylinders, the successive cylinders representing in the Arabic system, units, tens, hundreds and thousand digits respectively. The units cylinder, as shown in Figure 1, is driven in timed relation to the movement of the usual armature shaft 27 of the meter construction and toward this end a worm 24 carried by a shaft 25 meshes with a gear 22 secured to the cyclometer wheel 16. Bevel gears 24' or their equivalent serve to operatively connect the shafts 25 and 27. A lost motion device in the form of a spring 26 connects each of the cylinders 16 with its respective driving gear 22 while a series of protuberances 28 formed on the periphery of the cylinder are adapted to be successively projected beneath a spring pressed roller 30 periodically when the tension of the spring 26 reaches a predetermined maximum. The spring 26 presents a relatively small resistance to the free rotation of the cylinder and thus the cylinder is caused to periodically become automatically indexed in step-by-step fashion in order that the numerals or indicia thereon may be cumulatively presented at the window 20.

Referring now to Figure 2, a plurality of fixed contactor bars 32 are arranged in spaced relationship around the peripheries of the various cylinders 16 and are of sufficient length to span all four of these cylinders. Each cylinder is provided with an insulated metallic hub portion 34 to which there is affixed and electrically connected one end of a spiral contactor or distributor member 36 in the form of a spring, the outer end of which is adapted to successively engage the various contactor bars 32. The specific point of attachment of the spring 36 to the hub portion 34 and its length are such that as each indexing operation is performed, the outer end of the spring 36 will bear against a contactor bar 32 associated with the particular numeral or indicia which appears at the window 20. Accordingly, the various contactor bars in addition to their designating reference character have for illustrative purposes been supplied with Arabic numerals corresponding to those appearing on the face or periphery of the cylinder. Each hub portion 34 in effect constitutes a slip-ring contact and makes sliding contact with a brush 38, the brushes being electrically connected by lead wires $d$, $e$, $f$ and $g$ to respective contacts D, E, F and G of a selector switch 40, for a purpose which will presently appear.

Still referring to Figure 2, each of the conductor bars 32 is connected by means of lead wires $h$ to a two-part wire-wound resistor 42 at varying tap points thereon designated successively by Arabic numerals corresponding to the various digits of the indicia carried by the cylinders 16. The resistor 42 includes a section 60 having relatively coarse windings and a section 62 having relatively fine windings, the function of which will be set forth hereinafter. A lead line $i$ connects the conductor bar representing the digit 0 directly in a reading circuit and a lead line $k$ connects the line $i$ to the resistor 42 at a point of minimum or no resistance.

The selector switch 40 in addition to the contacts D, E, F and G, includes three additional contacts A, B and C, which are adapted to be selectively connected by means of lead lines $m$ and spring clips 44 to selected tap points on the resistor 42 representing a particular meter number as will appear presently.

A distributor arm 46 capable of being indexed by means of a ratchet mechanism 48 is grounded as shown and serves to separately and successively close an impedance reading circuit through the various contacts of the switch 40, lead wires $d$, $e$, $f$, $g$, or $m$ as the case may be, cyclometer device 10, wires $h$, portions of the resistor 42, and wires $k$ and $i$ through a pair of contacts 49 included in a switch 51, wires $n$ and $o$, a reading device 52, two-way switch 54 from a battery 53 or other source of current. The impedance value of the above-described circuit will depend, of course, upon the selection made by the switch 40 and upon the setting of the various spring clips 44 and the indication of the various cyclometer wheels 16. The reading device 52 which may be an ordinary volt meter will register and indicate the amount of the particular impedance value of the circuit when closed and thus render successive indications of the meter number as determined by the setting of the clips 44 and of the successive cyclometer readings as determined by the position of the wheels 16.

In order to actuate or index the selector switch arm 46 and periodically move the same in the direction of the arrow, a retarded relay mechanism in the form of a solenoid 65 having a delay-action copper jacket 66 is connected from a ground as shown through a pair of contacts 56 carried by a switch 51, to the lead $n$ which in turn is connected to a lead $p$ leading from the two-way switch 54. Closing of the circuit leading from the battery 53 through the leads $p$ and $n$, contacts 56 and solenoid 65 will serve to actuate the indexing mechanism 48. Actuation of the latter will, by means of an arm 58, cause the normally closed contacts 56 to become opened and the normally open contacts 49 to become closed, thus potentially establishing the selected impedance reading circuit, through the resistor 42 and reading device 52 as previously set forth. Upon movement of the switch 52 in such a manner as to close the selected impedance circuit during the functioning of the delay jacket 66 of the retarded relay mechanism, the selected indication will be set up in the reading device 52. This alternate movement of the switch 54 is defined herein as a "pulse and read" function and forms the subject matter of my copending application Serial No. 349,980 for a Meter reading apparatus.

It is to be noted that the coarse wound section 60 of the two part resistor 42 is representative of the first five Arabic numerals having low values, whereas the fine wound section 62 is representative of the other five numerals. In each portion of the resistor 42 the tap points are made at successively increasing distances along the resistor section inasmuch as the relatively high ohmic resistance offered by the reading device 52, being in series with the individual small ohmic resistance afforded by the resistor 42, would ordinarily preclude the possibility of equal voltage intervals being registered by the reading device 52. Thus not only are successively larger resistance portions introduced into the signaling circuit, but such portions are cumulatively introduced thereinto. The extent of the portions of the resistor 42 introduced into the impedance circuit is calculated according to correct engineering exigencies in order that substantially equal voltage intervals may be registered by the reading device 52.

It is thought that from the above description the nature and many advantages of my improved meter reading device will be apparent. For further illustrative purposes, it is pointed out that by observing the relative positions of the various spring clips 44, it may be determined that as the selector arm 46 is moved through the positions indicated at A, B and C, a meter number of "249" will be rendered by the reading device 52. Similarly by observing the relative positions of the various helical spring distributor members 36, it may be determined that as the selector arm 46 is moved through the positions indicated at D, E, F and G, a meter reading of 9018 will be rendered by the device 52.

What is claimed is:

1. In an apparatus of the character described, a counter mechanism including a plurality of counter wheels mounted for independent rotation about a common axis, means for moving said wheels to cause the same to assume different angular positions representing different arbitrary values, a plurality of elongated fixed spaced contactor bars arranged circumferentially about the periphery of said wheels and spaced therefrom, a distributor hub on each wheel, a distributor arm connected to each hub and designed for successive contact with said contactor bars upon movement of the respective wheel on which said hub is mounted, an ammeter responsive to variation in current passing therethrough, a resistor, means electrically connecting the resistor at different points thereof to each of the contactor bars, means electrically connecting the resistor at one point thereof through the ammeter to a source of current, and means electrically connecting each of the distributor hubs to said source whereby successive circuits are completed upon rotation of said wheels.

2. In an apparatus of the character described, a counter mechanism including a plurality of counter wheels mounted for independent rotation about a common axis, means for moving said wheels to cause the same to assume different angular positions representing different arbitrary values, a plurality of elongated fixed spaced contactor bars arranged circumferentially about the periphery of said wheels and spaced therefrom, a distributor hub on each wheel, a distributor arm connected to each hub and designed for successive contact with said contactor bars upon movement of the respective wheel on which said hub is mounted, an ammeter responsive to variation in current passing therethrough, a resistor, means electrically connecting the resistor at different points thereof to each of the contactor bars, means electrically connecting the resistor at one point thereof through the ammeter to a source of current, a normally open electrical connection between each of said hubs and said source adapted upon rotation of said wheels to close successive potential circuits through the conductor bars, resistor and reading device, and manually operable means for successively closing said normally open electrical connections.

3. In an apparatus of the character described, a plurality of axially aligned and independently movable meter-rotated cyclometer wheels each having ten indicia thereon representing ten numerical values in the Arabic numeral system, means mounting said wheels for independent rotation about a common axis, ten fixed contactor bars mounted in spaced circumferential relation about the peripheries of said wheels and spaced therefrom, a distributor arm electrically connected to each wheel and designed for successive contact with said bars upon rotation of the wheel, a brush electrically connected to each wheel, means connecting each contactor bar in an impedance reading circuit and means for rotating said wheels to separately and successively close said circuits.

4. In an apparatus for indicating at a remote point the relative positions of a series of movable members, a plurality of resistances the values of which are correlated with different positions capable of being assumed by each member, a switch including a plurality of stationary contacts common to all of the movable members, a cooperating movable contact mounted on each movable member and movable therewith for successive engagement with the stationary contacts, a reading circuit including a scalar indicator in series in the circuit, and means sequentially connecting each movable contact and a corresponding resistance in series in the circuit.

5. In an apparatus of the character described, a counter mechanism including a plurality of counter wheels mounted for independent rotation about a common axis, means for moving said wheels to cause the same to assume different angular positions representing different arbitrary values, a plurality of fixed spaced contactor bars arranged circumferentially about the periphery of said wheels and spaced therefrom, a distributor hub on each wheel, a distributor arm connected to each hub and designed for successive contact with said contactor bars upon movement of the respective wheel on which said hub is mounted, a reading circuit including a scalar indicator in series in the circuit, and means sequentially connecting each distributor arm and a corresponding resistance in series in the circuit.

6. In an apparatus for indicating at a remote point the relative positions of a series of movable members, a plurality of resistances of relatively low ohmic value which are correlated with different positions capable of being assumed by each member, a switch including a plurality of stationary contacts common to all of the movable members, a cooperating movable contact mounted on each movable member and movable therewith for successive engagement with the stationary contacts, a reading circuit including a scalar indicator of relatively high ohmic value in series in the circuit, and means sequentially connecting each movable contact and a corresponding resistance in series in the circuit, said resistances being of progressively increasing ohmic values whereby substantially equal scale intervals are registered on said scalar indicator.

WARD LEATHERS.